Patented Aug. 26, 1924.

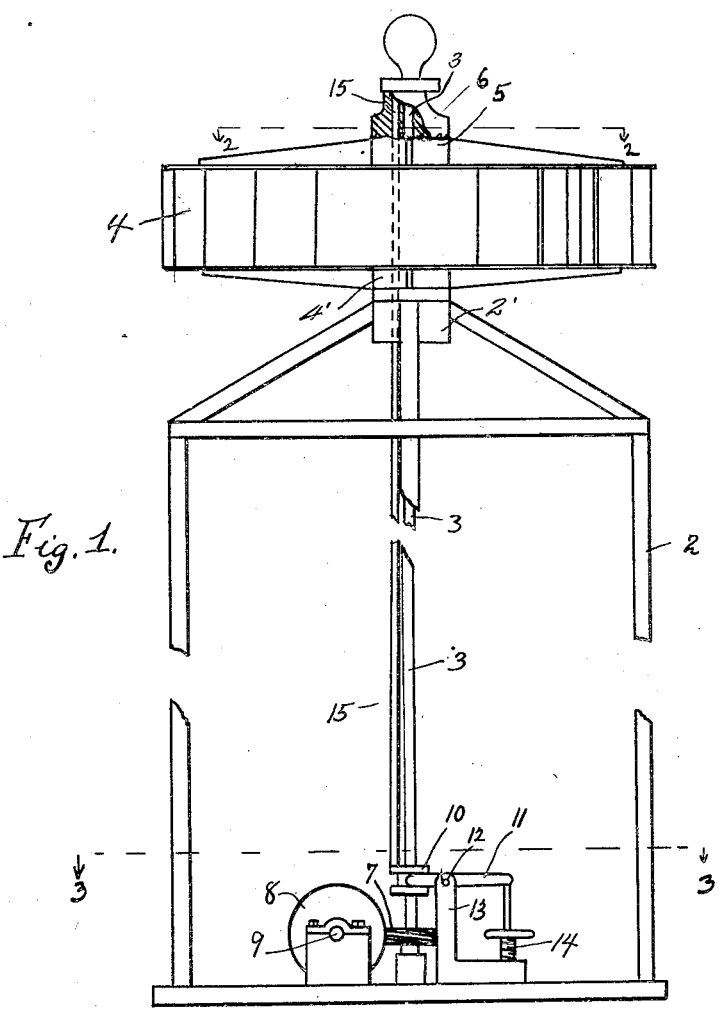

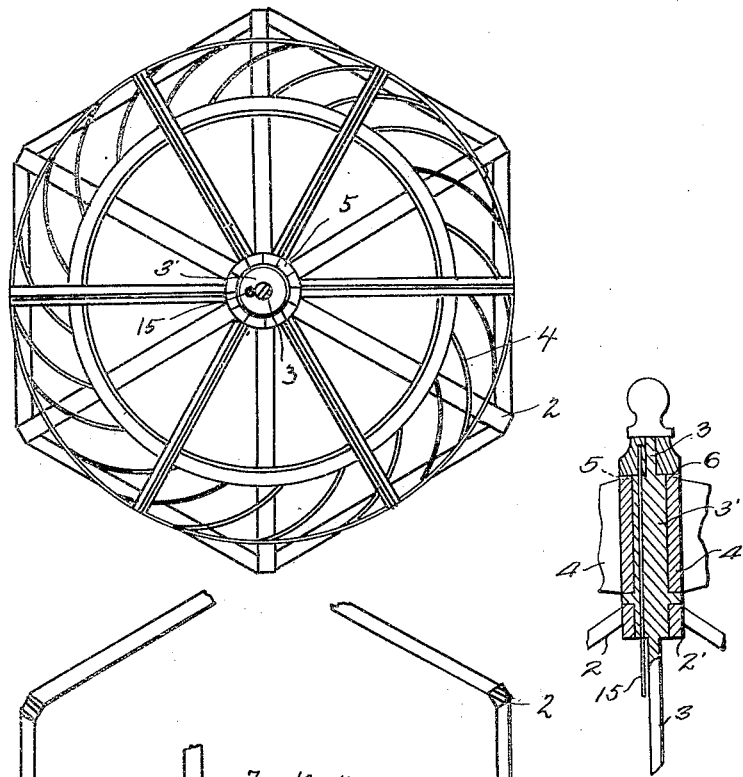
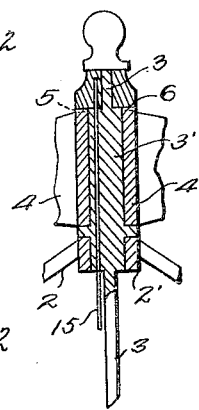
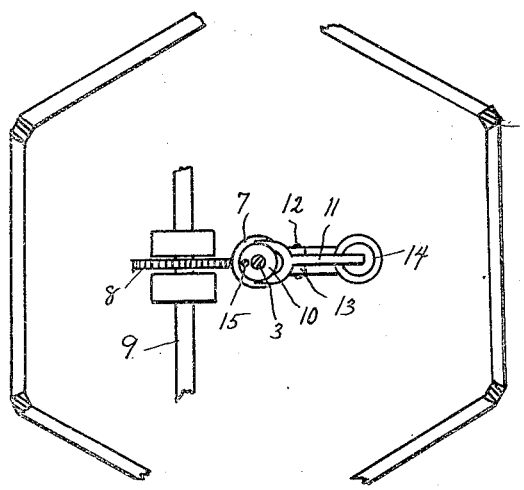

1,506,396

UNITED STATES PATENT OFFICE.

JOHN TYDINGS, OF SMITHVILLE FLATS, NEW YORK.

WIND MOTOR.

Original application filed November 15, 1921, Serial No. 515,329. Divided and this application filed February 16, 1922. Serial No. 536,909.

*To all whom it may concern:*

Be it known that I, JOHN TYDINGS, a citizen of the United States, residing at Smithville Flats, in the county of Chenango and State of New York, have invented new and useful Improvements in Wind Motors, which is a division of my application bearing Serial Number 515,329, of which the following is a specification.

My invention relates to new and useful improvements in a wind motor, which is a division of my application for Letters Patent for an apparatus to mechanically harness, store and transmit power, bearing Serial Number 515,329, dated November 15, 1921, and has for its object to provide a device of this character which will provide power to be mechanically stored and transmitted by means of the apparatus set forth in the above mentioned original application.

Another object of my invention is to provide a wind motor or wind mill of unique construction to be utilized for winding the springs of the apparatus referred to above.

A further object of my invention is to provide means whereby the wind wheel may be operatively connected with or disconnected from a shaft as occasion requires.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a side elevation of a wind motor embodying my invention, parts of which are broken away to plainly illustrate the construction.

Fig. 2, is a section at the line 2—2 of Fig. 1.

Fig. 3, is a section at the line 3—3 of Fig. 1.

Fig. 4, is a fragmentary vertical sectional elevation in the region of the wind wheel hub and clutch.

In carrying out my invention as here embodied, 2 represents a suitable framework including a bearing 2' having a vertical shaft 3 journalled therein about which is revolubly mounted a wind wheel 4 the blades of which are preferably arcuate in cross section, as shown in Fig. 2, and said wind wheel is provided with a hub 4'. In order to operatively connect said wind wheel with the vertical shaft I have shown said wind wheel as having a ratchet toothed clutch member 5 thereon which is adapted to be engaged by a similar complementary clutch member 6 which is slidably mounted upon the shaft 3 but splined thereon in any suitable and well known manner so as to revolve therewith or when said complementary clutch member 6 is in engagement with the clutch member 5 and the wind wheel is revolved the shaft 3 will be revolved and thereby transmit motion through the worm 7 on said shaft to the worm gear 8 on the shaft 9 by which the created power is transmitted to the apparatus for storing the same. In order to disengage the complementary clutch member 6 from the clutch member 5 so that the wind wheel may continue to revolve and the shaft 3 remain stationary I mount a grooved collar 10 on the shaft 3 which is engaged by a lever 11 pivoted at 12 to a suitable bracket 13 and this lever may be actuated by a screw 14. Coacting with the grooved collar 10 is a rod 15 which passes through an enlarged portion 3' of the shaft 3 and is connected with the complementary clutch member 6 so that when the grooved collar is moved upward along the shaft 3 said rod 15 will be likewise moved upward and carry the complementary clutch member 6 out of engagement with the clutch member 5. When the parts are thus operated the wind wheel is free to revolve about the enlargement 3' of the shaft 3 without affecting the latter.

From the foregoing description it will be obvious that I have provided an exceedingly simple, effective and efficient wind motor whereby the power produced by the winds may be transformed to a mechanical power and stored for future use.

Of course I do not wish to be limited to the exact details of construction as herein shown as these may be varied within the limits of the appended claims without departing from the spirit of my invention.

Having thus fully described my invention, what I claim as new and useful is:—

1. A wind motor for the purpose stated including a frame, a vertical shaft journalled in said frame, a wind wheel loose on said shaft and provided with a clutch member, a complementary clutch member slidably mounted on said shaft and arranged to revolve therewith, said complementary clutch member coacting with the first mentioned clutch member, a rod passing through a portion of the shaft and connected with the complementary clutch member, and means to move said rod longitudinally to disengage the complementary clutch member from its coacting clutch member.

2. A wind motor for the purpose stated including a frame, a vertical shaft journalled in said frame, a wind wheel loose on said shaft and provided with a clutch member, a complementary clutch member slidably mounted on said shaft and arranged to revolve therewith, said complementary clutch member coacting with the first mentioned clutch member, a rod passing through a portion of the shaft and connected with the complementary clutch member, a grooved collar on said shaft for coaction with the rod, a pivoted lever for moving said grooved collar along the shaft whereby the rod will be moved longitudially to disengage the complementary clutch member from the coacting clutch member whereby the wind wheel will be transmitted to revolve free of the shaft, means to actuate said lever, and means to transmit power from the shaft.

In testimony whereof, I have hereunto affixed my signature.

JOHN TYDINGS.